United States Patent
Gailloux et al.

(10) Patent No.: US 10,791,461 B1
(45) Date of Patent: Sep. 29, 2020

(54) MOBILE COMMUNICATION DEVICE USER AUTHENTICATOR

(71) Applicant: Sprint Communications Company L.P., Overland Park, KS (US)

(72) Inventors: Michael A. Gailloux, Overland Park, KS (US); Lauren Ricardo St. Aubyn King, Somerset, NJ (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 269 days.

(21) Appl. No.: 16/017,259

(22) Filed: Jun. 25, 2018

(51) Int. Cl.
*H04W 12/06* (2009.01)
*H04W 8/18* (2009.01)
*H04L 29/06* (2006.01)

(52) U.S. Cl.
CPC ........... *H04W 12/06* (2013.01); *H04L 63/083* (2013.01); *H04L 63/0861* (2013.01); *H04L 63/0876* (2013.01); *H04W 8/18* (2013.01)

(58) Field of Classification Search
CPC ............... H04L 63/083; H04L 63/0876; H04L 63/0861; H04W 12/06; H04W 8/18
USPC .......................................................... 726/6
See application file for complete search history.

(56) References Cited

U.S. PATENT DOCUMENTS

| | | | |
|---|---|---|---|
| 7,685,629 B1* | 3/2010 | White ................ | G06Q 20/3674 726/2 |
| 7,865,937 B1* | 1/2011 | White ................ | G06Q 20/3674 705/67 |
| 9,877,190 B1 | 1/2018 | Gailloux et al. | |
| 10,368,243 B1 | 7/2019 | Gailloux et al. | |
| 2003/0055738 A1* | 3/2003 | Alie ................... | G06Q 30/0601 705/26.1 |
| 2004/0087339 A1* | 5/2004 | Goldthwaite ........ | G06Q 20/341 455/558 |

(Continued)

OTHER PUBLICATIONS

Kiljan S, Vranken H, van Eekelen M. Evaluation of transaction authentication methods for online banking. Future Generation Computer Systems. Mar. 1, 2018;80:430-47. (Year: 2018).*

(Continued)

*Primary Examiner* — Syed A Zaidi

(57) ABSTRACT

A method of authenticating a mobile communication device subscriber. The method comprises receiving an authentication request from a third party, where the authentication request designates a level of authentication and comprises a telephone number of a mobile communication device to be authenticated, looking up identifying information based on the telephone number received in the authentication request, transmitting an authentication challenge to an authenticator client application on the mobile communication device associated with the looked up identifying information, where the authentication challenge is based on the level of authentication designated in the authentication request received from the third party, receiving a response to the authentication challenge from the authenticator client application, evaluating the response to the authentication challenge, and transmitting an authentication result based on the evaluation of the response to the authentication challenge to the third party that sent the authentication request.

20 Claims, 7 Drawing Sheets

(56) References Cited

U.S. PATENT DOCUMENTS

| | | | |
|---|---|---|---|
| 2004/0168090 A1* | 8/2004 | Chawla | H04L 63/0281 726/5 |
| 2005/0021782 A1 | 1/2005 | Malik et al. | |
| 2005/0144450 A1* | 6/2005 | Voice | H04L 63/0245 713/169 |
| 2006/0131386 A1 | 6/2006 | Takano | |
| 2007/0179885 A1* | 8/2007 | Bird | G06Q 20/10 705/39 |
| 2007/0233615 A1* | 10/2007 | Tumminaro | G06Q 20/322 705/75 |
| 2010/0257102 A1* | 10/2010 | Perlman | G06Q 20/401 705/75 |
| 2011/0320347 A1* | 12/2011 | Tumminaro | G06Q 20/0855 705/39 |
| 2012/0197740 A1* | 8/2012 | Grigg | G06Q 20/3278 705/16 |
| 2012/0275442 A1 | 11/2012 | Malets et al. | |
| 2013/0073463 A1* | 3/2013 | Dimmick | G06F 21/445 705/44 |
| 2013/0273891 A1 | 10/2013 | Sivalingham | |
| 2013/0317991 A1* | 11/2013 | Groat | G06Q 20/32 705/44 |
| 2014/0189347 A1 | 7/2014 | Madani | |
| 2014/0273965 A1 | 9/2014 | Raleigh et al. | |
| 2014/0357229 A1 | 12/2014 | Lee et al. | |
| 2015/0026351 A1 | 1/2015 | Calman et al. | |
| 2015/0242601 A1* | 8/2015 | Griffiths | G06F 21/31 726/5 |
| 2015/0242605 A1* | 8/2015 | Du | H04W 12/0605 726/7 |
| 2015/0312236 A1* | 10/2015 | Ducker | H04L 63/0876 726/4 |
| 2016/0078430 A1* | 3/2016 | Douglas | G06Q 20/3821 705/43 |
| 2016/0092872 A1* | 3/2016 | Prakash | G06Q 20/3825 705/65 |

OTHER PUBLICATIONS

NPL Search (Year: 2020).*
NPL Search Results (Year: 2020).*
Final Office Action dated Jan. 11, 2019, U.S. Appl. No. 15/836,800, filed Dec. 12, 2017.
Notice of Allowance dated Mar. 29, 2019, U.S. Appl. No. 15/836,800, filed Dec. 12, 2017.
AIPP Pre-Interview Communication dated Oct. 18, 2019, U.S. Appl. No. 16/446,396, filed Jun. 19, 2019.
Gailloux, Michael, et al., "System and Method for Authentication and Sharing of Subscriber Data," filed Jun. 19, 2019, U.S. Appl. No. 16/446,396.
First Action Interview Pre-Communication dated Dec. 30, 2016, U.S. Appl. No. 14/731,054, filed Jun. 1, 2015.
Final Office Action dated May 19, 2017, U.S. Appl. No. 14/731,054, filed Jun. 4, 2015.
Advisory Action dated Aug. 2, 2017, U.S. Appl. No. 14/731,054, filed Jun. 4, 2015.
Notice of Allowance dated Sep. 19, 2017, U.S. Appl. No. 14/731,054, filed Jun. 4, 2015.
FAIPP Pre-Interview Communication dated Sep. 4, 2018, U.S. Appl. No. 15/836,800, filed Dec. 12, 2017.
Gailloux, Michael, et al., "System and Method for Authentication and Sharing of Subscriber Data," filed Dec. 8 2017, U.S. Appl. No. 15/386,800.

* cited by examiner

MOBILE COMMUNICATION DEVICE USER AUTHENTICATOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are being used to provide a variety of communication services that extend beyond voice communication and content browsing. Mobile communication devices are being used to perform electronic banking functions, to access confidential information such as health and/or medical records, and to complete payments electronically, for example to make on-line purchases. These communication services provide convenience and access for wireless service subscribers that is very desirable. At the same time, providing access to these kinds of communication services can create security risks and create new pathways for criminals to perpetrate electronic thefts.

SUMMARY

In an embodiment, a method of authenticating a mobile communication device subscriber performed by an authenticator server application executing on a computer system is disclosed. The method comprises receiving identifying information associated with a wireless communication service subscriber from an authenticator client application installed on a mobile communication device and storing the identifying information keyed to a telephone number of the mobile communication device in a data store. The method further comprises receiving an authentication request from a third party, where the authentication request designates a level of authentication and comprises a telephone number of a mobile communication device to be authenticated, looking up identifying information based on the telephone number received in the authentication request, and transmitting an authentication challenge to an authenticator client application on the mobile communication device associated with the looked up identifying information, where the authentication challenge is based on the level of authentication designated in the authentication request received from the third party. The method further comprises receiving a response to the authentication challenge from the authenticator client application, evaluating the response to the authentication challenge, and transmitting an authentication result based on the evaluation of the response to the authentication challenge to the third party that sent the authentication request.

In another embodiment, a computer system that performs authentication services for mobile communication devices. The computer system comprises a processor, a non-transitory memory, and an authenticator server application stored in the non-transitory memory. When executed by the processor, the authenticator server application receives a first authentication request from a third party, where the first authentication request comprises a first telephone number of a first mobile communication device to be authenticated and where the first authentication request designates a first level of authentication, where the first level of authentication is associated with presenting information related to the third party on the first mobile communication device and prompting for input of acknowledgement of the presented information, looks up first identifying information based on the first telephone number received in the first authentication request, and transmits a first authentication challenge to a first authenticator client application on the first mobile communication device associated with the looked up first identifying information, where the first authentication challenge is based on the first level of authentication designated in the first authentication request received from the third party. The authenticator server application further receives a first response to the first authentication challenge from the first authenticator client application, where the first response indicates that the first authenticator client application presented the information related to the third party and received an acknowledgement input and, in response to receiving the first response, transmits a first authentication result to the third party that sent the first authentication request that indicates that the first level of authentication succeeded. The authenticator server application further receives a second authentication request from a third party, where the second authentication request comprises a second telephone number of a second mobile communication device to be authenticated and where the second authentication request designates a second level of authentication, where the second level of authentication is associated with presenting information related to the third party on the second mobile communication device, prompting to input a biometric on the second mobile communication device in acknowledgement of the presented information and looks up second identifying information based on the second telephone number received in the second authentication request. The authenticator server application further transmits a second authentication challenge to a second authenticator client application on the second mobile communication device associated with the looked up second identifying information, where the second authentication challenge is based on the second level of authentication designated in the second authentication request received from the third party. The authenticator server application further receives a second response to the second authentication challenge from the second authenticator client application, where the second response indicates that the second authenticator client application presented the information related to the third party, prompted for input of a biometric, and obtained confirmation that the input biometric agreed with a biometric of record stored on the second mobile communication device, and, in response to receiving the second response, transmits a second authentication result to the third party that sent the second authentication request that indicates that the second level of authentication succeeded.

In yet another embodiment, a mobile communication device is disclosed. The mobile communication device comprises a processor, a display, a non-transitory memory, a radio transceiver, and an authenticator client application stored in the non-transitory memory. When executed by the processor, the authenticator client application receives an authentication challenge comprising an indication of an authentication level from an authenticator server application executing on an authenticator server, where the authentication challenge is triggered by a server application executing on an application server different from the authenticator server and presents information related to the server application received in the authentication challenge on the display. The authenticator client application further transmits an authentication response to the authenticator server application, where the authenticator response is based on the authentication level and comprises information about a user acknowledgement of the information presented on the display, whereby the server application mitigates electronic fraud risks.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
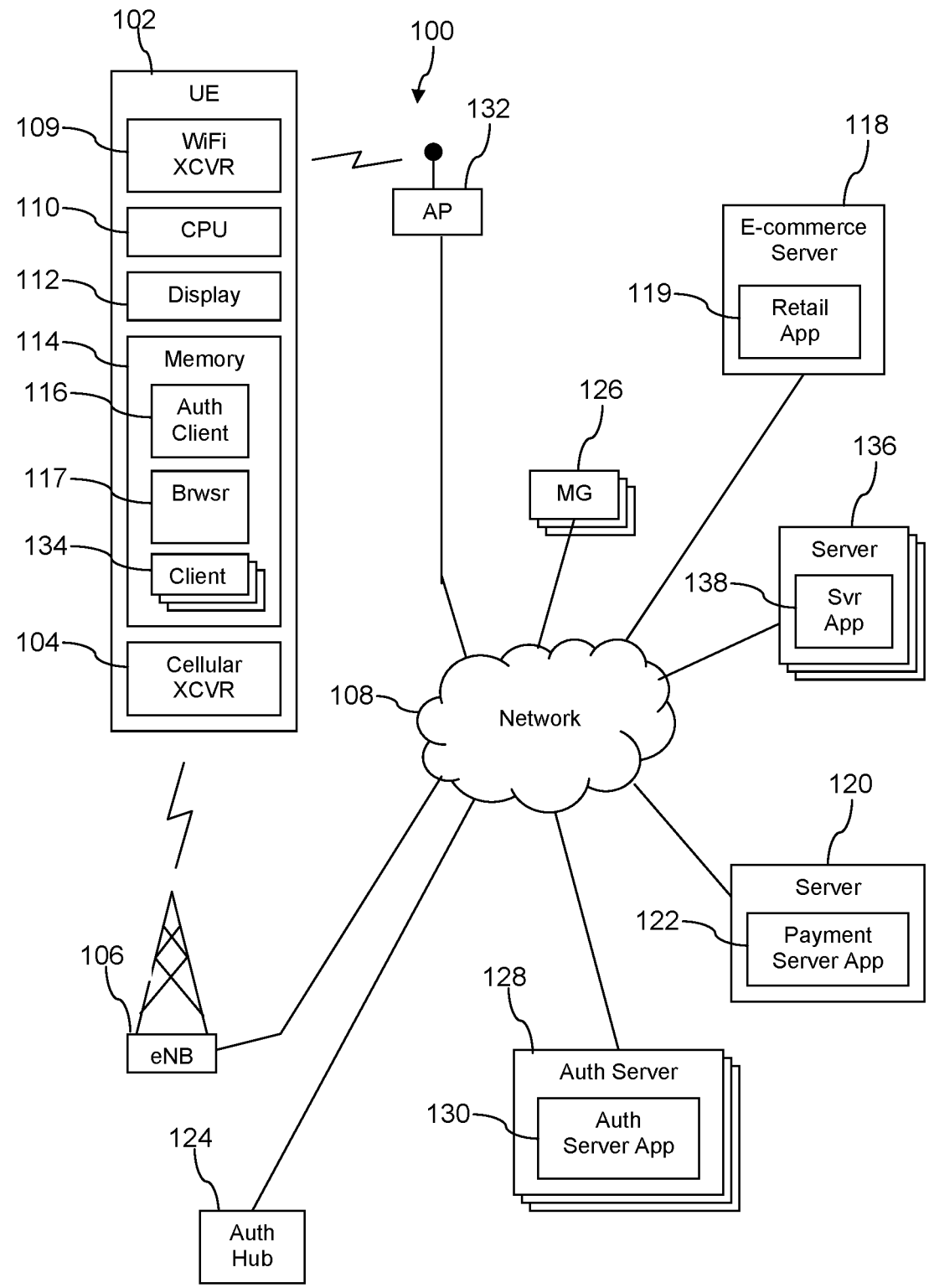
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices often support on-line shopping or electronic commerce type of purchases. From the perspective of the electronic retailer, this may be considered to be an anonymous purchase because at the communication layers the electronic retailer communicates with what may be a previously unknown IP address. This sort of anonymous purchase may be deemed precarious or risky by the electronic retailer. Granted, the electronic retailer can overlay security at the application layer by having a customer establish an account, access to which is mediated by entering a user identity and a password. Alternatively and/or in addition, the electronic retailer can rely on a two-factor authentication mechanism, such as the mobile communication device user entering an unique authentication number printed on a debit card ("have something," e.g., the physical card) and entering a confidential personal identification number or PIN ("know something," e.g., the PIN). Even here, however, at least when initially establishing an account, there is not much basis for trust. And even with two-factor authentication, an identity thief and collect the needed information to spoof a legitimate user by a variety of methods. While the example here is electronic commerce, the same concern pertains to anonymous access to other confidential information via the Internet such as health and/or medical records, electronic banking functions, and other confidential transactions. The present disclosure teaches an authenticator framework that provides new mechanisms and processes for authenticating a mobile communication device engaged in a confidential transaction that leverages a higher level of trust that is provided by the network access security mechanisms used to authenticate a mobile communication device into a wireless communication network.

An authenticator client application is installed on a mobile communication device, for example as an autonomous client application. Alternatively, the authenticator client application may be installed as a software development kit (SDK) embedded in another application on the mobile communication device, for example in a wireless communication service subscription self-service application that allows a user to manage his or her wireless communication service account. Part of the installation of the authenticator client application involves conducting an activation session between the authenticator client application and an authenticator server application that executes on a computer system in a wireless communication service provider domain. This activation session entails the authenticator server application requesting the authenticator client application to supply a variety of identifying information associated with the user of the mobile communication device. The authenticator client application may present a user interface on the mobile communication device, prompt the user to enter the requested identifying information, and relay the input identifying information back to the authenticator server application. The authentication server application stores the identifying information received from the authenticator client device or indexed by the phone number of the mobile communication device or indexed by another reference for ease of look-up in later authentication procedures. The identifying information may comprise one or more of a driver's license number, a residential address, a date of birth, a personal identification number (PIN) to be used in the future by the authenticator client application, a picture of an object familiar to the user (e.g., a picture of a family dog, a picture of a vase painted by Aunt Tilly, a picture of a view from the office window of the user), and other information. The activation session conducted during installation of the authenticator client may be associated with a secured access context whereby the authenticator server application is able to establish with high certainty that the user engaged in completing the authenticator client application is the authorized user of the mobile communication device.

The authenticator server application is configured to provide an application programming interface (API) that can be invoked by third parties such as electronic commerce payment brokers, financial institutions such as banks, healthcare or medical providers, health insurance carriers, and others. The API allows the third party to request authentication of a user of a mobile communication device at one of a plurality of different authentication levels based on identifying a telephone number of the mobile communication device. The authenticator server application, in response to an authentication request to the API from an authorized third party, establishes communication with the authenticator client application on the mobile communication device and causes the authenticator client application to perform authentication actions and reply to the authenticator server application. In some contexts herein this exchange between the authenticator server application and the authenticator client application is referred to as the authenticator server application sending an authentication challenge message to the authenticator client application and the authenticator client application returning an authentication challenge reply message to the authenticator server application. The authenticator server application evaluates the authentication challenge reply message returned by the authenticator client application. The authenticator server application then transmits an authentication result, determined based on its evaluation of the authentication challenge reply message, to the requesting third party.

A first level of user authentication may involve the user of the mobile communication device clicking an acknowledge button in a user interface presented by the authenticator client application. The acknowledge button may be presented with text, provided in the authentication challenge message sent by the authenticator server application, indicating the context of the authentication, for example text indicating that a payment transaction in an amount of $23.99 is being charged to his payment transaction account. The first level of authentication may be associated with what may be considered relatively low risk or low value confidences. In the example, $23.99 is not a very large risk relative to a payment transaction of $1000 or more.

A second level of user authentication may involve both presenting text information on the mobile communication device indicating the context of the authentication as well as the user providing some kind of information known to the user, for example the PIN the user setup with activating the authenticator client application. In an example, the authenticator server application may send six pictures in the authentication challenge message, one of which was provided by the user when activating the authenticator client application, the authenticator client application may present these six pictures with the text information and prompt the user to select the picture he or she is familiar with. The authenticator client application returns the input PIN or an indication of the selected picture in the authentication challenge response message sent back to the authenticator server application.

A third level of user authentication may involve presenting a biometric by the user on the mobile communication device. For example, the authenticator client application may prompt the user to input a biometric (e.g., scan a thumbprint on the device or scan a retina). The biometric may be captured by a biometric scanning peripheral of the device or by a touchscreen of the device. A service of the operating system of the device may have previously stored a canonical biometric value (e.g., an authoritative version of the biometric against which input biometric scans are compared). The biometric scanning service may capture the input biometric, compare the input biometric to the stored canonical biometric, and determine if the match satisfies a predefined matching threshold. The biometric scanning service may return the biometric match result to the authenticator client application, and the authenticator client application returns the biometric match result in the authentication challenge response message.

The three levels of user authentication described above can be said to establish a hierarchy of increasing user authenticity. Other levels of user authentication can also be provided by the authenticator framework but may not fit neatly into an ascending hierarchy of user authenticity. In an embodiment, a fourth level of user authentication may be provided by the authenticator server application determining a current location of the mobile communication device (e.g., request the authenticator client application invoke a GPS position fix and return GPS coordinates) and comparing that current location to a home location determined based on a history of device locations. A device that is located within 25 miles of Overland Park, Kans. that has a history of spending 80% of its time located within 100 miles of Kansas City may be deemed to be in its home location, and this can be construed as a kind of authentication of the user or of the mobile communication device. By contrast, if the location of the device instead is 500 miles away from its home location, the device may fail the fourth level of user authentication. It is observed that failing the fourth level of authentication may not be determinative of the authentication of the user.

A fifth level of authentication may be provided by the authenticator client application determining that the mobile communication device is in the coverage range of a WiFi access point (AP) that is among a set of WiFi APs commonly seen by the mobile communication device. In an embodiment, an authenticator client application may keep an ordered list of WiFi AP service set identifiers (SSIDs) that the mobile communication device detects. These SSIDs may be a home WiFi AP of the user of the device; a home WiFi AP of the next door neighbor of the user of the device, a WiFi AP of a grocery store where the user shops, a WiFi AP of an office where the user works. When the authenticator server application challenges the authenticator client application to conduct fifth level authentication, the authenticator client application determines SSIDs that are currently detected and compares these against a list of the most frequently detected SSIDs. One or more of the currently detected SSIDs is among the top 10 most frequently detected SSIDs, among the top 50 most frequently detected SSIDs, or among the top 100 most frequently detected SSIDs, the authenticator client application may reply that the fifth level authentication succeeded and otherwise may reply that the fifth level authentication failed. The criteria for fifth level authentication success may be that the mobile communication device detect an SSID that is detected at least 0.1% of the time by the device, at least 1% of the time by the device, at least 5% of the time by the device, or some other threshold percentage of time. Alternatively, the criteria for the fifth level authentication success may be defined with reference to a number of times the mobile communication device has detected a SSID, where each separate detection is separated in time by at least 24 hours. Yet other definitions of fifth level criteria for success are contemplated by the present disclosure.

As with the fourth level of authentication described above, failing the fifth level of authentication may not be dispositive of the authenticity of the user or of the mobile communication device. It may be that the third party that requests the authentication of the use of the mobile communication device uses the result of the fourth and/or fifth level of authentication with other indicators, for example in combination with the first level of authentication.

A third party wishing to authenticate a web server interaction with a mobile communication device and/or the user may interwork with mobile communication devices associated with a plurality of different wireless communication service providers. In this case, the question arises as to which of a plurality of service provider authentication server APIs to send an authentication request? The disclosure contemplates that the authentication framework described above would further comprise a hub server that the third parties could work through for completing some authentication steps. For example, the third party may initiate a process with the hub to discover the telephone number of the mobile communication device. The hub, when queried by the third party, may return an IP address of each of a plurality of different participating wireless communication service providers, for example the IP address of a computer system in the network of the wireless communication service provider. As an example, supposing there are four different wireless communication service providers, the hub may return the IP address of each of the participating four service providers (e.g., the IP address of a server designated for this authentication service). It is observed that, in an embodiment, the hub can be said to promote a single point of entry into the authentication process and to solve the question "where to start."

The third party may send the plurality of IP addresses to the wireless communication device, for example a web page associated with the third party that is currently presented and active on the wireless communication device. The web page executing on the device may send a data message to each of the IP addresses. The server at the IP address is configured to discover the IP address of the mobile communication device sending the data message (e.g., parse a source IP address in a header of the message), use that IP address of the mobile communication device to search a data store comprising entries of devices currently attached to that wireless communication network, after finding the entry (e.g., the computer system associated with the wireless communication service provider that provides service to the mobile communication device will find an entry while the other carriers' computer system may not) read the phone number of the device stored in that entry, and return a reply data message to the requesting web page including the phone number. The messages returned from computer system associated with the other service providers would return an empty message or an error message. The web page would return the phone number to the web application of the third party. In this way, the third party can obtain the phone number from the serving wireless communication service provider rather than from user input, which may provide a higher level of trust and may reduce the risk of device spoofing.

With the phone number of the mobile communication device the third party can then invoke the authentication operations described above, providing the phone number and one or more levels of authentication desired (e.g., level 1 authentication plus level 4 authentication) to the authentication server of the appropriate service provider. In an embodiment, the third party may instead send the authentication request to the hub, and the hub may determine which authenticator server is associated with the telephone number in the authentication request received from the third party. For example, the hub may be able to query the service providers which one the telephone number is served by. This embodiment provides a purer form of single interface into the authentication process.

Turning now to FIG. 1, a communication system 100 is described. In an embodiment, the system 100 comprises a mobile communication device (user equipment (UE)) 102 having a cellular radio transceiver 104 that is configured to establish a wireless communication link with a cell site 106 according to at least one of a long term evolution (LTE), a code division multiple access (CDMA), a global system for mobile communication (GSM), or a worldwide interoperability for microwave access (WiMAX) telecommunications protocol. The cell site 106 may communicatively couple to the UE 102 to a network 108. The network comprises one or more public networks, one or more private networks, or a combination thereof. In an embodiment, the UE 102 comprises a WiFi radio transceiver 109 that is configured to establish a wireless communication link with a WiFi access point (AP) 132. The WiFi AP 132 may communicatively couple the UE 102 to the network 108.

The UE 102 is one of a mobile phone, a smart phone, a personal digital assistant (PDA), a headset computer, a wearable computer, a laptop computer, a tablet computer, or a notebook computer. The UE 102 further comprises a processor 110, a display 112, and a memory 114. The memory 114 comprises a non-transitory memory portion. In an embodiment, the memory 114 also comprises a transitory memory portion. The non-transitory memory portion of the memory 114 comprises an authenticator client application 116 and a browser application 117. In an embodiment, the authenticator client application 116 is stored in a partition of non-transitory memory portion of memory 114 that is not accessible by a user, for example in a system memory partition or in a carrier memory partition. An operating system of the UE 102 may restrict access to a system partition or to a carrier partition to reduce the risk that an unauthorized individual alters or corrupts the behavior of the authenticator client application 116. For example, the operating system of the UE 102 may require confidential credentials of an original equipment manufacturer (OEM) to access and alter the system partition of memory and may require confidential credentials of a wireless communication service provider (e.g., a 'wireless carrier') to access or alter the carrier partition of memory.

The browser application 117 may present a web page of a retail web application, for example a retail web application 119 executing on an electronic commerce server 118. When a user of the UE 102 initiates a purchase transaction, the retail web page may transfer the browser application 117 to a web page of a payment web server application 122 executing on a server 120 (e.g., the browser presents the web page provided by the payment web server application 122). Pursuant to the user initiating a payment transaction through the payment web server application 122, the third party operator of the payment web server application 122 may wish to seek some further authentication of the user of the UE 102, to reduce the risk of fraud for example.

The system 100 further comprises an authentication hub 124, a plurality of media gateways 126, a plurality of authentication servers 128, each authenticator server 138 executing an authenticator server application 130. In an embodiment, the system 100 further comprises a plurality of servers 136 each executing a server application 138 that mediates access to confidential information such as banking accounts, investment accounts, health-medical records, and other confidential information. The non-transitory memory portion of the memory 114 of the UE 102 may further comprise client applications 134, each client application 134 corresponding to a server application 138. Each client application 134 may provide a mechanism for a user of the UE 102 to access and/or alter confidential information through initiating actions or transactions on the server applications 138. Thus, the third parties operating the server applications 138, like the third party operating the payment web server application 122, may wish to seek some further authentication of the user of the UE 102, to reduce risk of fraud, theft of private information, and the like.

Figure 2:
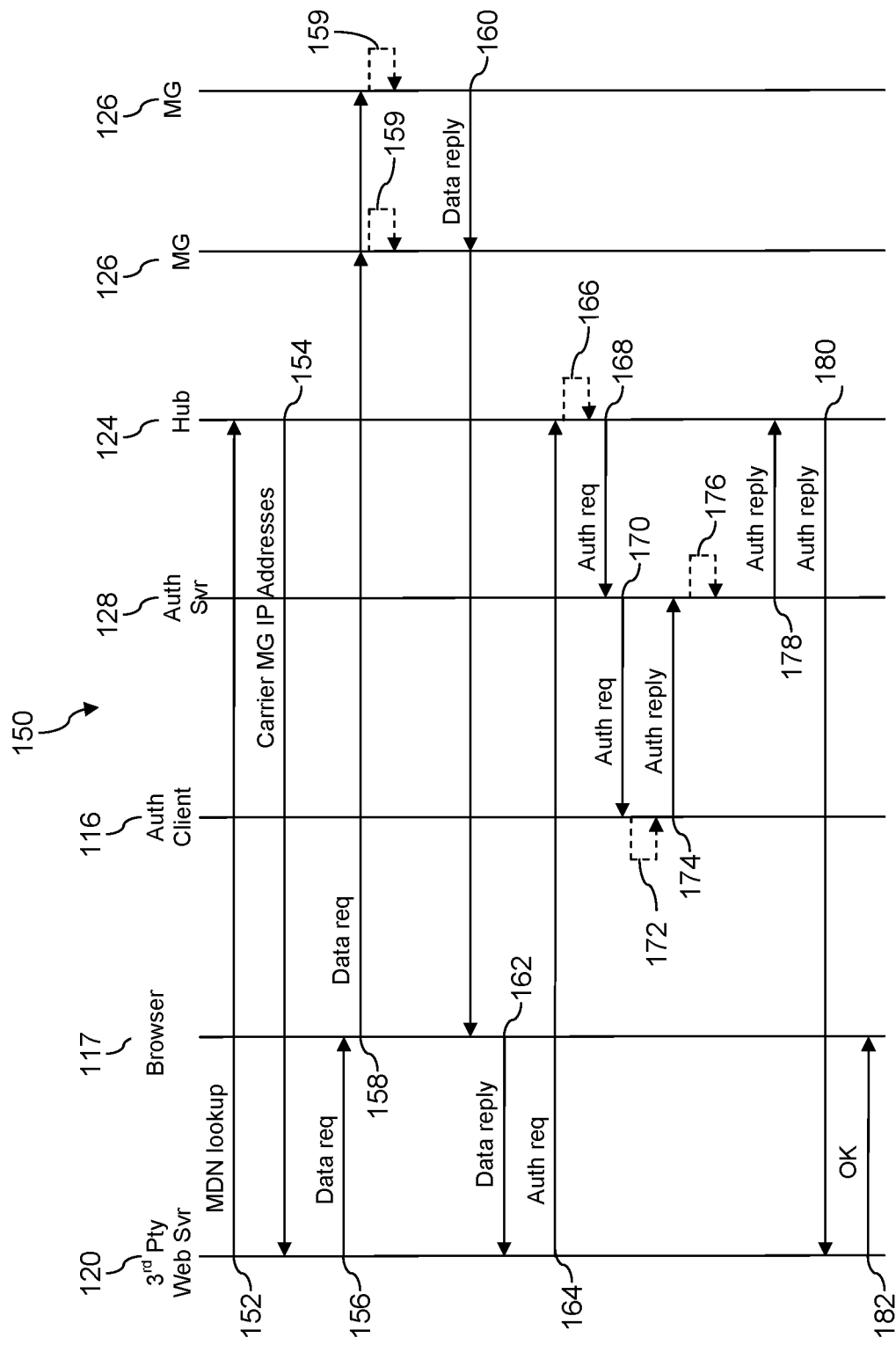
FIG. 2 is a message sequence diagram according to an embodiment of the disclosure.

Turning now to FIG. 2, a message sequence diagram 150 is described. The context for the sequence of messages in FIG. 2 may be the user of the UE 102 initiating a payment transaction in the retail web application 119 web page in the browser application 117. The server 120 sends a mobile directory number (MDN) lookup request message 152 to the authentication hub 124. The authentication hub 124 returns a message 154 comprising a plurality of IP addresses, each IP address associated with one of the media gateways 126. The number of IP addresses and of the media gateways 126 may be determined by the number of wireless communication carriers that collaborate to provide a user authentication framework and that have integrated with the authentication hub 124. In an embodiment, the authentication hub 124 returns four IP addresses corresponding to four different media gateways 126, each media gateway 126 operated by a different one of four major US wireless communication service providers. In an alternative embodiment, the authentication hub 124 may return a message 154 that comprises a plurality of IP addresses, where each IP address is associated with a different communication node in the wireless communication service provider networks that conduct the kind of telephone number lookup process described with reference to the media gateways 126.

The server 120 sends a data request message 156 containing the IP addresses received in message 154 to the browser application 117 (e.g., via the web page content and active instructions associated with the payment web server application 122), where the data request message 156 causes the browser application 117 to send out data request messages to each of the contained IP addresses (e.g., to the media gateways 126). The browser 117 (e.g., via the web page content and active instructions of the web page) sends a data request message 158 to each of the IP addresses (e.g., to the media gateways 126). Each of the media gateways 126 parses 159 the message 158 to find an IP address of the UE 102 and then uses that IP address as a key to search for an entry in a data base that could have been created with the UE 102 authenticated into the radio access network (RAN) of the subject wireless communication service provider.

In a typical case, one of the media gateways 126 will find an entry for the UE 102 (the media gateway 126 associated with the service provider that provides wireless communication service to the UE 102 and/or to the subscriber associated with the UE 102) and the other media gateways 126 will fail to find an entry and will return an empty message 160, an error message, or some other message. The media gateway 126 that successfully finds an entry keyed to the IP address of the UE 102 reads a telephone number of the UE 102 that is stored in entry retrieved from the data store and returns this telephone number in a success message 160 to the browser 117. The browser 117 sends a data reply message 162 to the server 120 containing each of the responses sent by the media gateways 126. The server 120 learns the telephone number of the UE 102 by sifting through the data reply messages returned from the browser 117. It is noted that by obtaining the telephone number of the UE 102 in this manner, rather than prompting a user to enter the telephone number on the UE 102, the server 120 avoids the possibility that the user may enter a false telephone number into the UE 102 and leverages the high level of security supported by the process of authenticating into a RAN by the UE 102.

The server 120 sends an authentication request message 164 comprising the telephone number of the UE 102 (e.g., the telephone number determined via the sequence of messages 152 through 162) to the authentication hub 124. Alternatively, in an embodiment, the server 120 sends the authentication request message 164 comprising the telephone number of the UE 102 directly to the appropriate authenticator server 128. In an embodiment, the authentication request message 164 further identifies an authentication level or a plurality of authentication levels. The authentication request message 164 may comprise content to be presented in the browser 117 on the UE 102, for example text indicating that a payment is being initiated in the name of the user of the UE 102 in a specific amount for an identified product or service.

In an embodiment, the authentication hub 124 receives the authentication request message 164, parses the telephone number of the UE 102 and at 166 determines which of the plurality of authenticator servers 128 is associated with the telephone number (e.g., what wireless communication service provider has the UE 102 with the given telephone number as a subscriber and what is the authenticator server 128 of that given wireless communication service provider?). The authentication hub 124 forwards the authentication request message 168 to the authenticator server 128.

The authenticator server 128 sends an authentication request message 170 to the authenticator client application 116 executing on the UE 102. The authentication request message 170 comprises an indication of an authentication level that the authenticator client application 116 is configured to interpret and take action 172 appropriately. If an authentication level 1 is called for, the authenticator client application 116 may be configured to present content on the display 112 informing the user of the UE 102 what confidential transaction, such as an electronic payment transaction, is in progress and prompting the user to acknowledge the activity or to reject the activity. If an authentication level 2 is called for, the authenticator client application 116 may be configured to present content on the display 112 informing the user of the UE 102 what confidential transaction is in progress and prompt the user to input a PIN or to select a known image from a plurality of images presented on a display of the device. If an authentication level 3 is called for, the authenticator client application 116 may be configured to present content on the display 112 informing the user of the UE 102 what confidential transaction is in progress, prompt the user to acknowledge the confidential transaction, and further prompt the user to input a biometric. The action 172 may further include the authenticator invoking performance of a biometric scan and verification operation by an operating system of the UE 102. If an authentication level 5 is called for, the authenticator client application 116 may determine one or more WiFi SSIDs associated with currently received WiFi access point signals. The authenticator client application 116 captures the user input or inputs to the UE 102 and returns an authenticator reply message 174 comprising an indication of the input or inputs and possibly the result of a biometric scan and possibly the WiFi SSIDs of currently received WiFi access point signals to the authenticator server 128. It is understood that in some cases the authentication request message 170 may identify a plurality of authentication levels in the same request message 170.

If an authentication level 2 is called for, the authenticator client application 116 may present content on the display 112 informing the user of the UE 102 what confidential transaction is in progress, prompt the user to acknowledge the activity or to reject the activity, and further prompt the user to input a personal identification number (PIN) associated with the authenticator client application 116 (e.g., a PIN created for the authenticator framework). Alternatively, the authentication request 170 may comprise a plurality of images, one of which was configured by the authenticator client application 116 when it was installed on the UE 102, and the authenticator client application 116 may present the images and prompt the user to select one of the images that is familiar. The authenticator client application 116 sends the authenticator reply message 174 comprising the PIN or an indication of which image was selected to the authenticator server 128. In an embodiment, prompting the user to acknowledge the activity may comprise prompting the user to input the PIN or to select one of the images.

If an authentication level 3 is called for, the authenticator client application 116 may present content on the display 112 informing the user of the UE 102 what confidential transaction is in progress and prompt the user to acknowledge the activity or to reject the activity. The authenticator client application 116 may further prompt the user further prompt the user to input a biometric while at the same time invoking performance of a biometric scan and verification operation by an operating system of the UE 102. The authenticator client application 116 sends the acknowledgement and the result of the biometric scan in the authenticator reply message 174 to the authenticator server 128.

The authenticator server application 130 executing on the authenticator server 128 receives the authenticator reply message 174. In an embodiment, if a level 1 authentication or a level 3 authentication was requested, the authenticator server 128 sends an authenticator reply message 178 to the authentication hub 124 containing an indication of the authenticator results (user acknowledged/rejected or biometric matched/unmatched). Alternatively, in the situation that one or more additional authentication levels are identified, the authenticator server application 130 may perform additional authentication actions 176 to satisfy the additional authentication levels before bundling the authenticator results obtained from the authenticator client application 116 with the results of the additional authentication actions and sending the bundled results in the authentication reply message 178 to the authentication hub 124.

If a level 2 authentication was requested, the authenticator server application 130 compares the input of the user (e.g., a PIN input or an input of a selection of one among a plurality of images presented on the display 112) to an expected value (e.g., a PIN value configured on installation of the authenticator client application 116 on the UE 102 or an image stored in the authenticator server 128 or in the authenticator server application 130 during configuration of the authenticator client application 116). If the input matches the expected value, the UE 102 passes the level 2 authentication; if the input does not match the expected value, the UE 102 fails the level 2 authentication. The authentication server 128 sends the result of the level 2 authentication in the authenticator reply message 178 to the authentication hub 124. Alternatively, in the situation that one or more additional authentication levels are identified, the authenticator server application 130 may perform additional authentication actions 176 to satisfy the additional authentication levels before bundling the authenticator results obtained from the authenticator client application 116 with the results of the additional authentication actions and sending the bundled results in the authentication reply message 178 to the authentication hub 124.

In the event a level 4 authentication was also requested, the authentication request 164 may comprise a command to the authenticator client application 116 to invoke a GPS position fix determination on the UE 102 and to return the GPS coordinates in the authenticator reply message 174. The authenticator server application 130 may compare the current location of the UE 102, indicated by the GPS coordinates, to a history of locations of the UE 102. If the GPS coordinates indicate that the UE 102 is located within a customary geographical region, the level 4 authentication may be deemed to have passed otherwise the level 4 authentication may be deemed to have passed. It is observed that failure of a level 4 authentication may not be dispositive of the trustworthiness of the UE 102 completing a confidential transaction, for example completing a payment transaction.

The authenticator server application 130 may periodically determine a customary geographical region for each of a plurality of UEs 102 that have been provisioned with the authenticator client application 116. The authenticator client application 116 may periodically report one or more GPS coordinates to the authenticator server application 130 to promote the authenticator server application 130 to build a history of locations of the UE 102. For example, the authenticator client application 116 may invoke a GPS position fix on the UE 102 every 10 minutes, collect the GPS coordinates, and report the GPS coordinates once per day to the authenticator server application 130. In an embodiment, the authenticator client application 116 may reduce the frequency of collecting and/or reporting GPS coordinates after a predefined interval of time, for example after a month of operation on the UE 102. The authenticator server application 130 may analyze the GPS coordinate data provided by the authenticator client application 116 to determine a centroid of GPS coordinates and a radius that encloses some predefined percentage of the GPS coordinates, for example 60%, 70%, 80% or some other percentage. This region defined by the centroid and the radius may be deemed the customary geographical region of operation of the UE 102 and used for performing the level 4 authentication.

In the event a level 5 authentication was also requested, the authentication request 164 may comprise a command to the authenticator client application 116 to query the operating system of the UE 102 to identify the SSIDs of WiFi APs 132 that are detected at the present time. The authenticator client application 116 provides the SSIDs of these WiFi APs 132 in the authenticator reply message 174. The authenticator server application 130 analyzes these SSIDs to determine if any of them are among a set of SSIDs commonly detected by the UE 102. The authenticator client application 116 may collect data on detected SSIDs and periodically send this SSID information to the authenticator server application 130. For example, the authenticator client application 116 may determine detected SSIDs every 10 minutes, collect the list of detected SSIDs during a 24 hour period, and send the collected list of detected SSIDs to the authenticator server application 130 for storage and analysis. The authenticator server application 130 can analyze the data on detected SSIDs for each of the UEs 102 to rank the detected SSIDs in order of most commonly detected to least commonly detected for each of the UEs 102. If the authenticator reply message 174 contains an SSID that the authenticator server application 130 determines to be among a threshold number of most frequently detected SSIDs, the authenticator server application 130 deems the UE 102 to have passed the level 5 authentication and otherwise it deems the UE 102 to have failed the level 5 authentication. If the UE 102 detects a WiFi SSID that it commonly detects, this information may imply that the UE 102 is currently located in a customary location and has not been recently stolen and relocated to an unfamiliar location where it may be used to perpetrate fraudulent transactions.

The authentication hub 124 transmits the authenticator reply message 180 to the server 120. The payment web server application 122 evaluates the authenticator results and determines whether to proceed with the ongoing transaction, to drop the transaction, or to challenge the user to provide further corroborating information. In an embodiment, the server 120 sends an OK message 182 to the retail application 119 web page in the browser 117, and the retail application 119 web page responds accordingly. Alternatively, the server 120 sends a transaction rejection message to the retail application 119 web page. Alternatively, the server 120 sends a different message to the retail application 119 web page, for example requesting the user to input further corroborating information. It is understood that like authenticator processes can be conducted with other servers 136 and other server applications 138 to secure access to confidential information different from payment transactions associated with electronic commerce. For example, like authenticator processes can be supported for banking account transactions, for example for looking at bank balances, for depositing checks, for transferring money between accounts. For example, the authenticator processes can be supported for access to confidential information like health-medical records.

Figure 3:
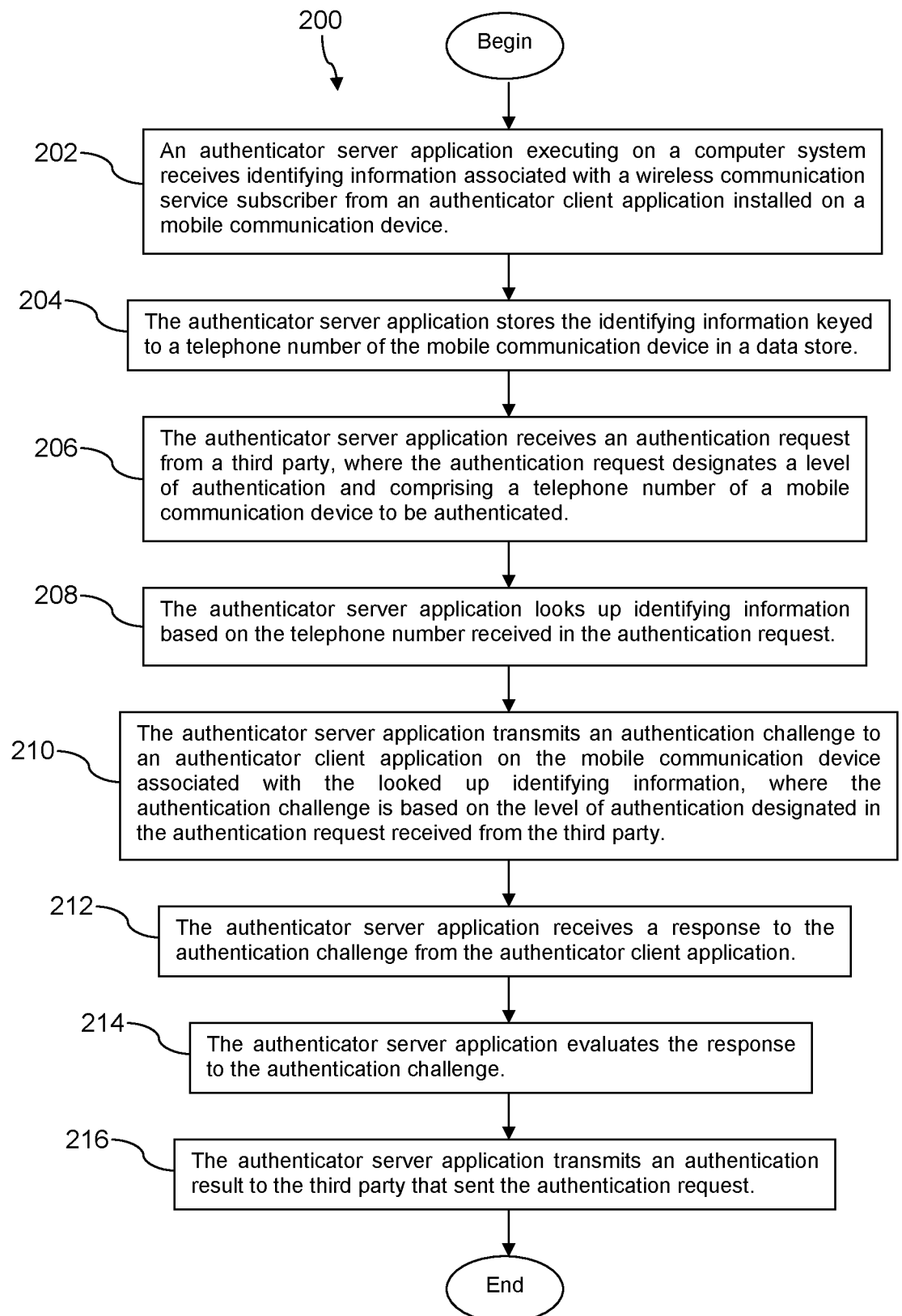
FIG. 3 is a flow chart according to an embodiment of the disclosure.

Turning now to FIG. 3, a method 200 is described. At block 202, an authenticator server application executing on a computer system receives identifying information associated with a wireless communication service subscriber from an authenticator client application installed on a mobile communication device. The identifying information may be a residence address, a driver's license number, a gender, a date of birth, a personal identification number (PIN), a picture of an object familiar to the user of the mobile communication device or subscriber. At block 204, the authenticator server application stores the identifying information keyed to a telephone number of the mobile communication device in a data store.

At block 206, the authenticator server application receives an authentication request from a third party, where the authentication request designates a level of authentication and comprising a telephone number of a mobile communication device to be authenticated. The third party may be a server computer that executes an application related to the third party, for example a web server that mediates access to confidential information or provides an interface to complete financial transactions such as payment transactions or banking transactions. At block 208, the authenticator server application looks up identifying information based on the telephone number received in the authentication request. At block 210, the authenticator server application transmits an authentication challenge to an authenticator client application on the mobile communication device associated with the looked up identifying information, where the authentication challenge is based on the level of authentication designated in the authentication request received from the third party. In an embodiment, the authentication challenge causes the authenticator client application on the mobile communication device to prompt a user of the device to input identifying information, for example to input a PIN, to input a driver's license number, to input a residence address, to input a birthday, or to input other personal information associated with the user or subscriber that might not be generally known to identify thieves. In an embodiment, the authentication challenge comprises a plurality of digital images, one of which was provided in block 202 to the authenticator server application, and causes the authenticator client application to present the plurality of digital images on a display of the mobile communication device and challenges the user or subscriber to select or designate the image that is personal to them.

At block 212, the authenticator server application receives a response to the authentication challenge from the authenticator client application. At block 214, the authenticator server application evaluates the response to the authentication challenge. At block 216, the authenticator server application transmits an authentication result to the third party that sent the authentication request. The authentication result may be provided as a binary value, for example success or failure, pass or fail. Alternatively, the authentication result may be provided as a number in a range of values, for example an integer in the range of 1 to 5 or from 1 to 10 or from 0 to 5 of from 0 to 10 or some other range of values.

Figure 4:
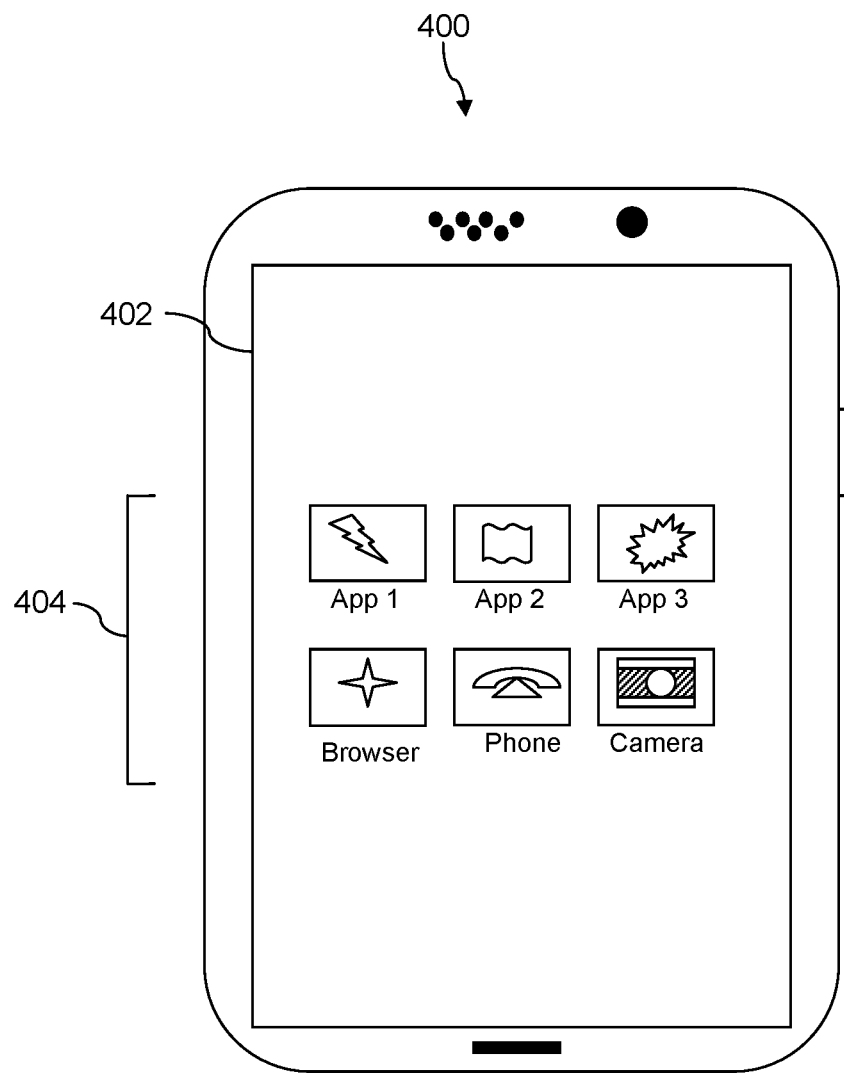
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
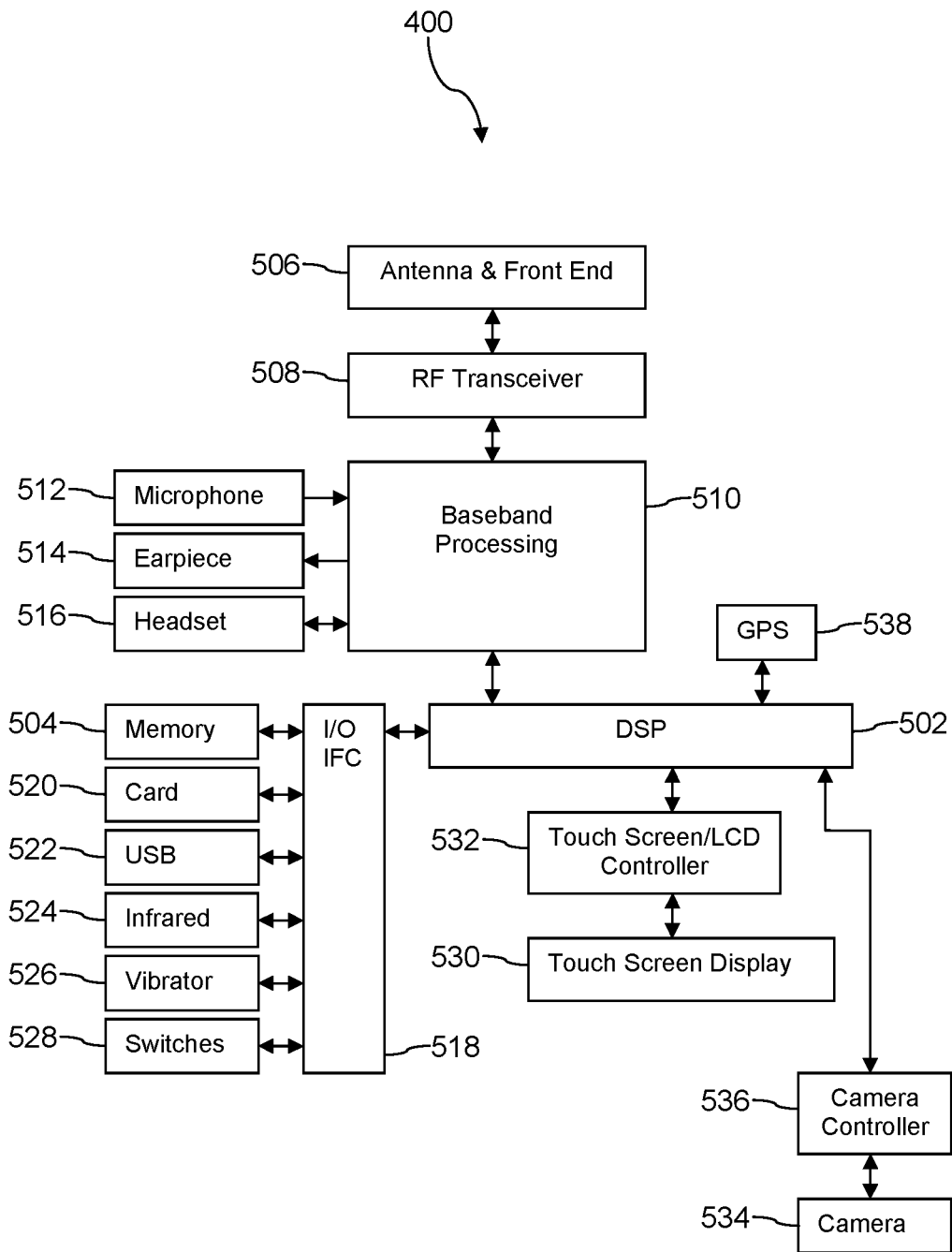
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
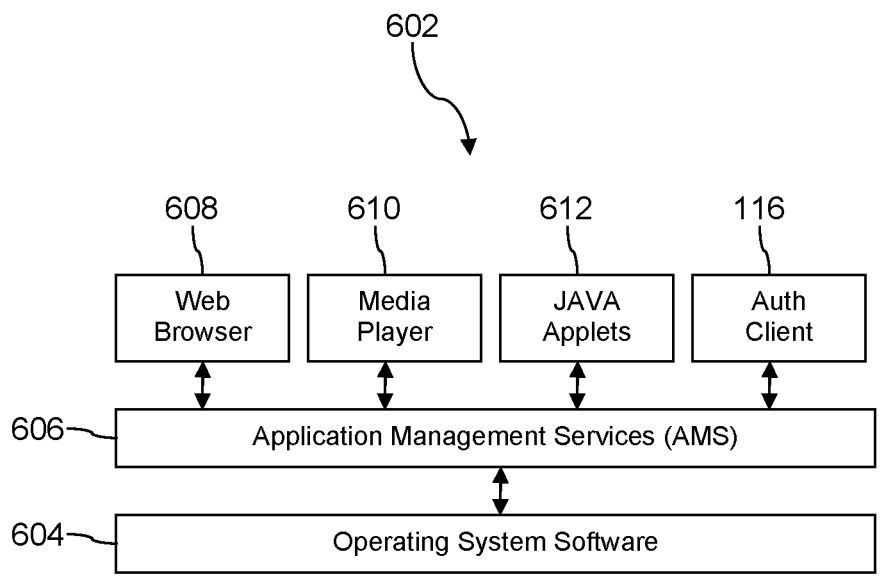
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, JAVA applets 612, and the authenticator client application 116. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
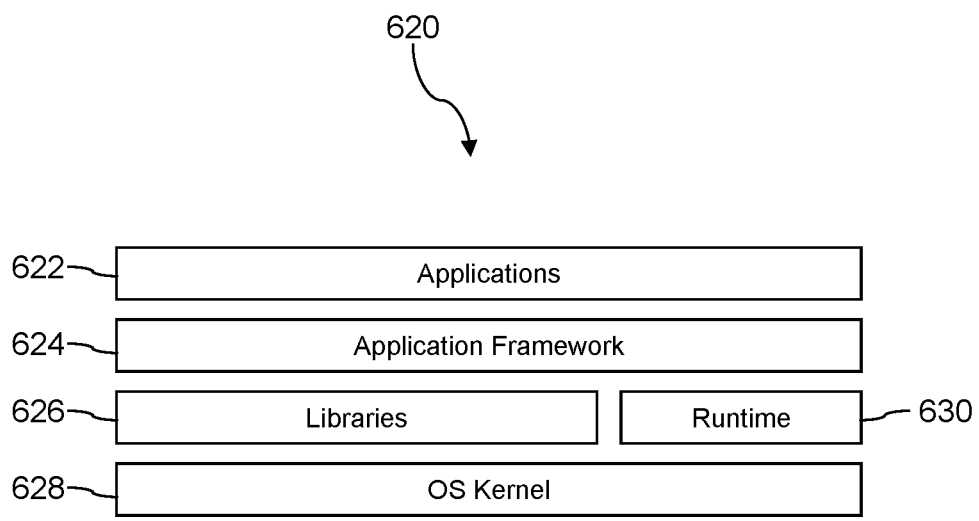
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
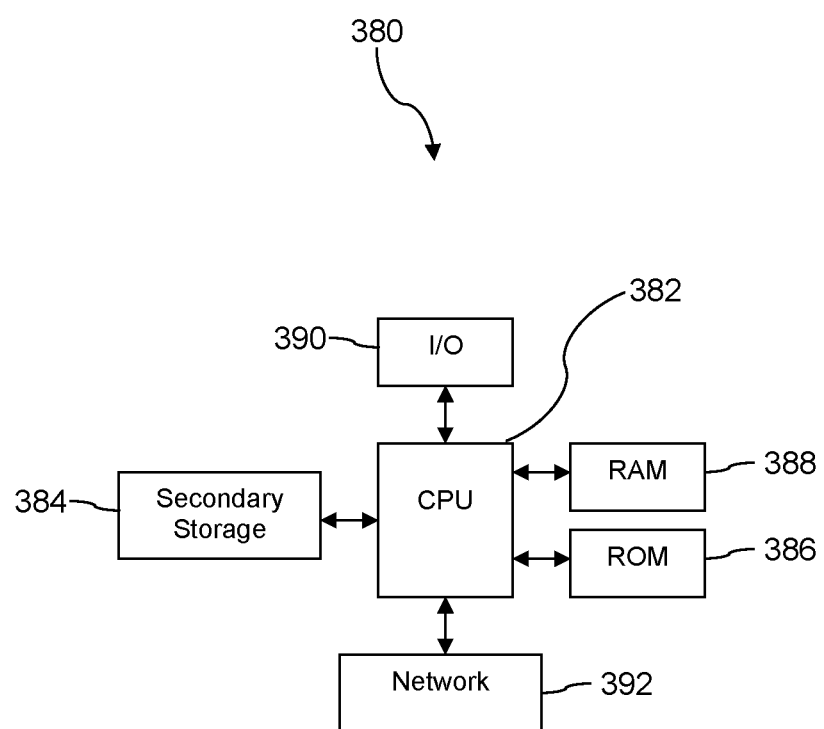
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating a mobile communication device subscriber performed by an authenticator server application executing on a computer system, comprising:
   receiving identifying information associated with a wireless communication service subscriber from an authenticator client application installed on a mobile communication device;
   storing the identifying information keyed to a telephone number of the mobile communication device in a data store;
   receiving an authentication request from a third party, where the authentication request designates a level of authentication and comprises a telephone number of a mobile communication device to be authenticated;
   looking up identifying information based on the telephone number received in the authentication request;
   transmitting an authentication challenge to an authenticator client application on the mobile communication device associated with the looked up identifying information, where the authentication challenge is based on the level of authentication designated in the authentication request received from the third party;
   receiving a response to the authentication challenge from the authenticator client application;
   evaluating the response to the authentication challenge; and
   transmitting an authentication result based on the evaluation of the response to the authentication challenge to the third party that sent the authentication request.

2. The method of claim 1, wherein the looked up identifying information comprises a digital image received from the authenticator client application installed on the mobile communication device, the authentication challenge comprises the digital image received from the authenticator client application installed on the mobile communication device to which the authentication challenge is sent and digital images not provided by the authenticator client application on the mobile communication device to which the authentication challenge is sent, the response to the authentication challenge comprises a selection of one of the digital image and the digital images not provided by the authenticator.

3. The method of claim 2, wherein evaluating the response to the authentication challenge comprises determining if the selection in the response to the authentication challenge matches the digital image received from the authenticator client application installed on the mobile communication device.

4. The method of claim 1, wherein the looked up identifying information comprises one of a driver's license number, a residence address, or a date of birth, the authentication challenge causes the authenticator client application to present a prompt to input identifying information on the mobile communication device, the response to the authentication challenge comprises identifying information input to the authenticator client application, and evaluating the response to the authentication challenge comprises determining if the input identifying information matches identifying information stored in the data store keyed to the telephone number of the mobile communication device.

5. The method of claim 1, further comprising:
   receiving a second authentication request from a third party, where the second authentication request designates a level of authentication and comprises a telephone number of a second mobile communication device to be authenticated;

transmitting a second authentication challenge to a second authenticator client application on the second mobile communication, where the authentication challenge is based on the level of authentication designated in the second authentication request;

receiving a second response to the second authentication challenge from the second authenticator client application; and transmitting a second authentication result based on the second response to the third party that sent the second authentication request.

6. The method of claim 5, further comprising, responsive to the level of authentication designated in the second authentication request, looking up a customary location region of the second mobile communication device;

determining that a current location of the second mobile communication device provided in the second response is contained within the customary location region of the second mobile communication device, wherein the second authentication result indicates that the second mobile communication device is located in a customary location for the second mobile communication device.

7. The method of claim 5, further comprising, responsive to the level of authentication designated in the second authentication request, looking up a set of WiFi SSIDs commonly detected by the second mobile communication device;

determining that a WiFi SSID provided in the second response is contained in the set of WiFi SSIDs commonly detected by the second mobile communication device, wherein the second authentication result indicates that the second mobile communication device detects a WiFi SSID that it commonly detects.

8. A computer system that performs authentication services for mobile communication devices, comprising:

a processor;

a non-transitory memory; and an authenticator server application stored in the non-transitory memory that, when executed by the processor:

receives a first authentication request from a third party, where the first authentication request comprises a first telephone number of a first mobile communication device to be authenticated and where the first authentication request designates a first level of authentication, where the first level of authentication is associated with presenting information related to the third party on the first mobile communication device and prompting for input of acknowledgement of the presented information;

looks up first identifying information based on the first telephone number received in the first authentication request;

transmits a first authentication challenge to a first authenticator client application on the first mobile communication device associated with the looked up first identifying information, where the first authentication challenge is based on the first level of authentication designated in the first authentication request received from the third party;

receives a first response to the first authentication challenge from the first authenticator client application, where the first response indicates that the first authenticator client application presented the information related to the third party and received an acknowledgement input;

in response to receiving the first response, transmits a first authentication result to the third party that sent the first authentication request that indicates that the first level of authentication succeeded;

receives a second authentication request from a third party, where the second authentication request comprises a second telephone number of a second mobile communication device to be authenticated and where the second authentication request designates a second level of authentication, where the second level of authentication is associated with presenting information related to the third party on the second mobile communication device, prompting to input a biometric on the second mobile communication device in acknowledgement of the presented information;

looks up second identifying information based on the second telephone number received in the second authentication request;

transmits a second authentication challenge to a second authenticator client application on the second mobile communication device associated with the looked up second identifying information, where the second authentication challenge is based on the second level of authentication designated in the second authentication request received from the third party;

receives a second response to the second authentication challenge from the second authenticator client application, where the second response indicates that the second authenticator client application presented the information related to the third party, prompted for input of a biometric, and obtained confirmation that the input biometric agreed with a biometric of record stored on the second mobile communication device; and in response to receiving the second response, transmits a second authentication result to the third party that sent the second authentication request that indicates that the second level of authentication succeeded.

9. The system of claim 8, wherein the authenticator server application is configured to respond to an authentication request designating a second level of authentication by transmitting a second authentication challenge that causes an authenticator client on a mobile communication device to present a prompt on a display of the mobile communication device to acknowledge presented information.

10. The system of claim 8, wherein the authenticator server application is configured to respond to an authentication request designating a third level of authentication by transmitting a third authentication challenge that causes an authenticator client on a mobile communication device to perform a biometric scan and match process on the mobile communication device.

11. The system of claim 8, wherein the authenticator server application is configured to respond to an authentication request designating a fourth level of authentication by transmitting a fourth authentication challenge that causes an authenticator client on a mobile communication device to request a GPS location fix and to return GPS coordinates in a response to the fourth authentication challenge and compares the returned GPS coordinates to a customary region of location associated with the mobile communication device.

12. The system of claim 8, wherein the authenticator server application is configured to respond to an authentication request designating a fifth level of authentication by transmitting a fifth authentication challenge that causes an authenticator client on a mobile communication device to identify detected WiFi AP SSIDs and to return the detected WiFi AP SSIDs in a response to the fifth authentication request and compares the returned detected WiFi AP SSIDs to a set of WiFi AP SSIDs commonly detected by the mobile communication device.

13. The system of claim 8, wherein the third party is a payment transaction company.

14. The system of claim 8, wherein the third party is a bank.

15. A mobile communication device, comprising:
   a processor;
   a display;
   a non-transitory memory;
   a radio transceiver; and
   an authenticator client application stored in the non-transitory memory that, when executed by the processor:
      receives an authentication challenge comprising an indication of an authentication level via the radio transceiver from an authenticator server application executing on an authenticator server, where the authentication challenge is triggered by a server application executing on an application server different from the authenticator server,
      presents information related to the server application received in the authentication challenge on the display, and
      transmits an authentication response via the radio transceiver to the authenticator server application, where the authenticator response is based on the authentication level and comprises information about a user acknowledgement of the information presented on the display,
   whereby the server application mitigates electronic fraud risks.

16. The mobile communication device of claim 15, wherein the mobile communication device is one of a mobile phone, a smart phone, a personal digital assistant (PDA), a headset computer, a wearable computer, a laptop computer, a tablet computer, or a notebook computer.

17. The mobile communication device of claim 15, wherein the radio transceiver is configured to establish a wireless communication link with a cell site based on long term evolution (LTE), a code division multiple access (CDMA), a global system for mobile communication (GSM), or a worldwide interoperability for microwave access (WiMAX) telecommunications protocol.

18. The mobile communication device of claim 15, wherein a first authentication level causes the authenticator application to prompt for input of user acknowledgement of the information presented on the display, a second authentication level causes the authenticator to prompt for user input of personally identifying information, and a third authentication level causes the authenticator to trigger a biometric scan.

19. The mobile communication device of claim 18, wherein the second authentication level causes the authenticator to prompt the user to input a personal identification number (PIN) associated with the authenticator client application or to prompt the user to select an image previously configured by the authenticator client application from among a plurality of images presented on the display.

20. The mobile communication device of claim 18, wherein the third authentication level causes the authenticator client application to prompt for user input of a biometric and to request an operating system of the mobile communication device to capture the biometric, compare the input biometric to a stored biometric, and return a success/fail indication to the authenticator client application.

\* \* \* \* \*